Figure 6:
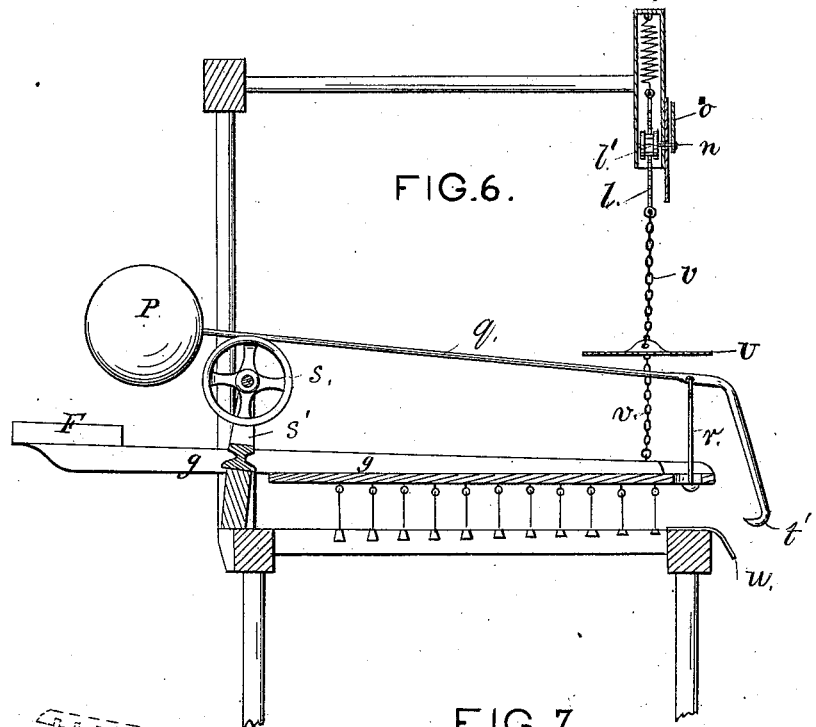

3 Sheets—Sheet 1.
D. T. WINTER.
Machines for Ascertaining the Area and Weight of Hides.
No. 215,853. Patented May 27, 1879.
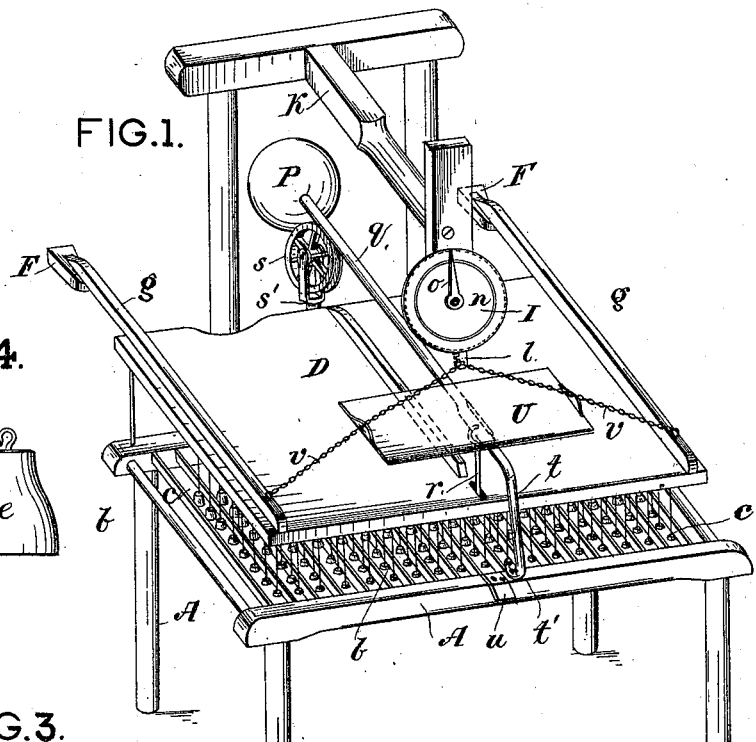
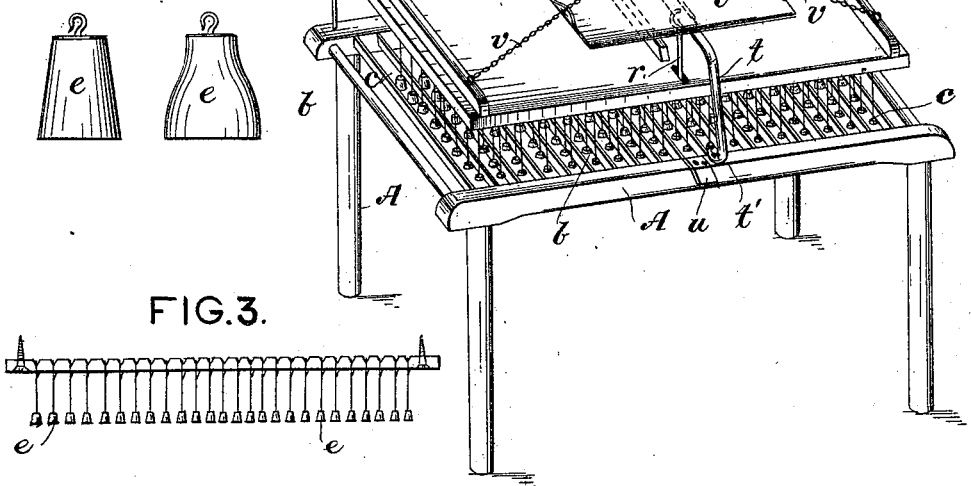
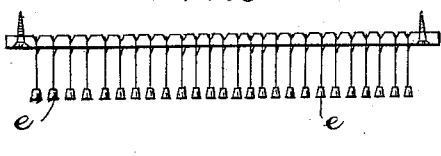
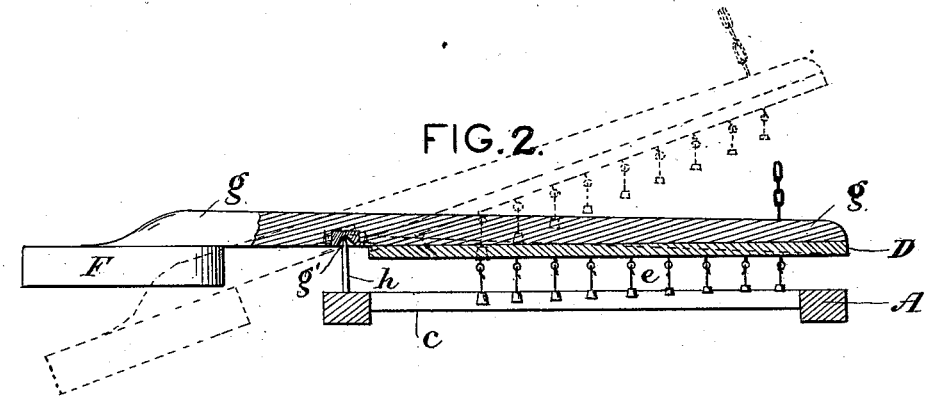
WITNESSES
Milo W. McNeil
Chas. E. Teague
David T. Winter, INVENTOR.
By John J. Halsted, ATTORNEY.

3 Sheets—Sheet 2.

D. T. WINTER.
Machines for Ascertaining the Area and Weight of Hides.

No. 215,853. Patented May 27, 1879.

WITNESSES

David T. Winter
INVENTOR,
By John J. Halsted,
ATTORNEY

3 Sheets—Sheet 3.

D. T. WINTER.
Machines for Ascertaining the Area and Weight of Hides.

No. 215,853. Patented May 27, 1879.

WITNESSES
Penn Halsted
Saml R Turner

David T. Winter INVENTOR
by John J. Halsted
ATTORNEY

UNITED STATES PATENT OFFICE.

DAVID T. WINTER, OF PEABODY, MASSACHUSETTS, ASSIGNOR OF ONE-HALF HIS RIGHT TO CHARLES E. TEAGUE, OF SAME PLACE.

IMPROVEMENT IN MACHINES FOR ASCERTAINING THE AREA AND WEIGHT OF HIDES.

Specification forming part of Letters Patent No. 215,853, dated May 27, 1879; application filed March 14, 1879.

*To all whom it may concern:*

Be it known that I, DAVID THOS. WINTER, of Peabody, in the county of Essex and State of Massachusetts, have invented certain new and useful Improvements in Machines for Measuring and Weighing Skins and other articles; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My improvements have for their object a simplifying of the construction and the reduction of the labor and power in operating machines for measuring and weighing skins.

Skin-measuring machines, so far as known to me, as heretofore made, require that the table on which the skin is placed for measurement shall have a vertical movement, and they are also plentifully perforated to afford independent openings to admit a weight or rod through each opening, and it was also important to preserve as far as practicable a steady level or horizontal position for the weighted table.

By my present improvements I dispense with any movement of the lower table, make the upper or weighted table not only a counterbalanced lever, but so apply and operate it that but slight power is needed to raise it, when it automatically shifts its center of gravity and sustains itself in its tilted and raised position until again drawn down for another measurement of a skin.

The improvements further consist in entirely dispensing with the system of perforations in the skin-supporting table, and using instead a table having parallel slats, so that the space for the descent of the weight is greatly increased, and there is but little solid material in the bed of the table which can offer any impediment to the free action of the weights, and in suspending the weights by cords or thread directly from the bottom of the lever-table; in suspending the forward end of such lever-table directly from the spring of the indicating-scale; in attaching a skin-weighing platform directly under the scale and to the chains or connections which connect it with the forward end of the weighted lever-table, and in other details, hereinafter set forth.

Figure 7:
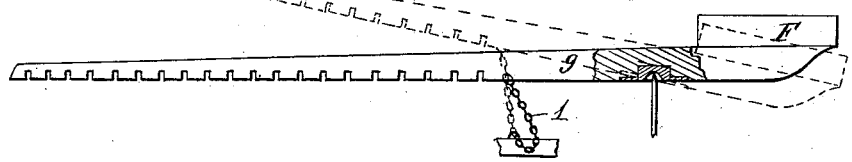
Figure 5:
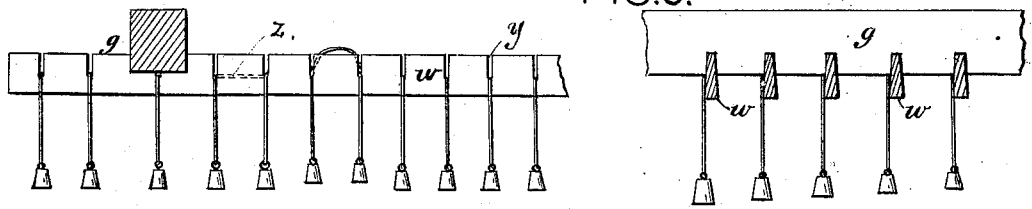

Figure 1 illustrates one form of machine embodying my improvements; Fig. 2, a sectional detail, enlarged; Fig. 3, a different mode of suspending the weights; Fig. 4, different forms of weights, enlarged; Fig. 5, still another mode of hanging the weights; Fig. 6, a vertical section through the bracket and scale; Fig. 7, a modified mode of balance-weighting the tilting-table, and Figs. 8 and 9 a modification of the upper table and its connections.

A is the stationary table for supporting a skin to be measured, and its top or skin-supporting portion *b* is a mere frame, having a series of parallel bars, *c*, on which the skin is placed, the bars being made as thin horizontally and as deep vertically as may be consistent with the space desired for the unobstructed movements of the pendent weights, and with the proper support of the skin and the needed strength of the table.

D is the rocking or lever table, to the under side of which are suspended by threads or cords the required weights *e*, these weights being disposed in parallel rows, as shown, so that each row may hang over the space between two adjacent bars, *c*, of the lower table. This rocking or tilting piece D further differs from the suspended tables heretofore used or constructed in having no series or system of perforations to receive and support measuring pins or weights, while the manner of applying the weights to it also differs from them in being hung from hooks or eyes, or in any equivalent manner attached permanently to the table D, and the weights are free to swing laterally as this table is tilted.

F F are counterbalancing-weights, placed at the rear extremities of braces or bars *g g*, which project rearward from D, and their function is to counterpoise or balance the table exactly, the table itself resting upon pivotal points or edges *h h* to make this practical, and the braces or stringers *g g* having grooves or concaves $g'$ on their under side to admit such points or edges. There may be more than two pivotal points or edges, $h$, or one continuous edge.

The pendent measuring-weights $e$ in each row, commencing with the second row, (next to the outer or front row,) are of greater weight than those in its next adjacent outer row, proportioned to the distance of each row from the fulcrum or pivotal line of their tilting-table, and the weights of each successive row hang lower when the table is in a level position than those of its next adjacent outer row, those which are nearest the fulcra or fulcrum hanging the lowest. The objects of these features will be more fully explained presently.

These weights $e$ may be made of metal or of any other desired material that will not deface the leather or other article to be measured, and they may be connected to the table by twine or any flexible connection as slight as it can be consistent with the requisite strength and durability; and they are preferably made of somewhat cone shape, and flat on the bottom, as shown in Fig. 4, though they may be of any other suitable shape.

I is a spring-balance or indicator, placed over the front part or edge of the table D, and supported on any appropriate bracket, K, or frame fixedly secured to the stationary table or rack A.

To the toothed or rack bar $l$ of this spring-balance (and which actuates the pinion $l'$, on whose arbor $n$ the index-hand $o$ is secured) is suspended the chain or the links or other appropriate connections which connect the forward end of table D to the spring-balance, and such connection converts this table into a graduated scale-beam. The spring-balance may, however, if desired, be hung from the ceiling or roof of a building instead of from an arm extending over the top of the machine.

To enable the upper table to tip up and backward from the front, and to aid it in thus pivoting or turning on its fulcrum-points as upon hinges, a heavy weight, P, sufficient to overbalance the whole set of pendent weights, is attached to the rear end of a shifting rod or lever, $q$, (see Figs. 1 and 6,) and the other end of this rod is furnished with a movable or flexible connection, $r$, which connects it to the front edge of the graduated scale beam or table D. This rod or lever $q$ near its weighted end rests in the groove of a pulley, $s$, supported in a standard, $s'$, secured to the back beam or stringer of the under table, A, and so that it may ride upon such pulley as the graduated scale-beam D is raised and lowered. The forward or movable connection, $r$, permits the proper movement of the weight during such raising and lowering, thus carrying the weight farther to the rear when the scale-beam is raised, thus shifting the weight relatively to the fulcrum, and causing this beam to be easily lifted and to be automatically held up when lifted; and when the skin is placed upon the table A to be measured it needs but little strength of the workman to pull the beam down again to a level, as the shifting weight P now moves nearer to the fulcrum and aids in restoring the equilibrium of the beam.

The connection $r$ may be a rod, as shown, or a chain; but it should be so applied as to restrain the distance to which the weight P may be shifted upon its pulley, and also so as to prevent the rod or lever $q$, which carries this weight, from becoming accidentally detached from the machine.

The rod $q$ and table D are provided with any suitable means for clasping them together when the upper table, D, has been pulled down to a horizontal position. I have shown for that purpose a continuation of the rod $q$ bent downward, as at $t$, and provided with a hook, $t'$, which engages with any hasp, bar, or piece, $u$, on the table A.

Instead of employing the pulley $s$ to support the lever $q$ the latter may be hung at its center from the roof, or from the arm or bracket K, with a cord or chain. In this case a heavier counterbalance-weight would be required.

It will, of course, be understood that the drawings cannot properly display the very large number of weights required in a full-sized operative machine. I will, however, proceed to describe more fully certain of the parts in what we call a "No. 1 sized machine," suitable for measuring goat-skins, sheep-skins, and other articles of comparatively small area—say, capable of measuring twenty (20) square feet, or five (5) feet by four (4) feet.

The bars or slats $c$ we would make about two inches in depth, a quarter of an inch in thickness, and five feet long, the slats being wood or of any other suitable material. The slats should be three-quarters of an inch apart from each other—that is, one inch from the center of one bar to the center of the thickness of the next bar. This will afford in such a table an open space between each two slats of five feet by three-quarters of an inch, and will demand two thousand eight hundred and eighty weights, each placed one inch apart from its neighboring one, or, in other words, sixty rows of weights, each row having forty-eight. The upper table has substantially the same superficial area as the slatted or lower table.

The spring-balance or indicator should be hung five feet forward of the fulcrum edge or points, and about directly over the front edge of the scale or lever beam D. When the weights $e$ are all hung to place, their weight will pull down the spring in the spring-balance, and also lower the table D, with its weights $e$, and these latter will drop into or through the spaces between the slats, and cause the pointer to indicate their weight on the graduated face or dial-plate.

The forty-eight rows of weights extend back from the front of the machine to within one foot of the rear of the table, the line of the first row running directly under the connection which unites the scale-beam to the spring-balance, and the forty-eighth row being forty-eight inches back of that, thus leaving a space of twelve inches at the back of the table for its whole length unweighted. This brings the thirty-first row in the middle line of the table or graduated scale-beam D, and, therefore, in order that the weights in this row shall be equal in operative effect to those in the first or outer row, they must each weigh twice as much as the outer ones. Let the weights in the front or outer row weigh each one-eighth of an ounce; those in the middle should weigh one-quarter of an ounce; those in the forty-sixth row, one-half of an ounce; in the forty-seventh row, seventeen-thirtieths of an ounce, and in the forty-eighth or back row nineteen-thirtieths of an ounce.

Thus the weights in each row, commencing with the second, will increase in weight one two hundred-and-fortieth of an ounce over its adjacent outer row till the center is reached; and the weights in the forty-eighth or back row will each weigh one hundred and twenty-two two-hundred-and-fortieths of an ounce more than each weight of the front row.

Thus I have a system of graduated weights adapted to the graduated scale-beam D, and each and all of the weights are, in consequence of their relative weights being made proportionate to their distances from the fulcrum or pivotal center, equivalent to one-eighth of an ounce on the spring-balance or indicator.

The whole number of weights being two thousand eight hundred and eighty, and each weighing in effect one-eighth of an ounce, gives twenty-two and one-half pounds on the spring-balance, for the table itself, it will be remembered, is, by reason of its weighted extensions, self-balancing, or *in equilibrio*, and therefore producing no effect upon the indicator.

If, therefore, the pointer or end of the hand should make a complete circuit of the dial for twenty-two and one-half pounds—that is, when all the two thousand eight hundred and eighty weights above named drop through the slats in the table A—then by placing a piece of skin or other article having a superficies or area of a square foot (and of any shape, regular or irregular) upon the slats, it will prevent one hundred and forty-four weights from dropping through the openings between the slats, and the pointer consequently would only indicate twenty-one and three-eighths pounds, or one and one-eighth pounds less than before, and would move two-fortieths or one-twentieth of the circuit less than it did when all the weights were left free to drop. A foot of surface would therefore be equal to or indicated by the movement of the pointer one-twentieth of the circumference of the circle or face of the dial. One of the weights represents in such case one two-thousand-eight-hundred-and-eightieth of the circumference of the circle; and in such case the weight P should be about twenty-three and one-half pounds, or sufficient to overbalance the aggregate or total of the pendent weights *e*—viz., twenty-two and one-half pounds.

By bearing down the front end of the lever-beam D, this overbalance P is lifted, its loose connection in front is slackened, its hook $t'$ is hooked to the lower stationary table, A, and the spring-balance then has upon it just the twenty-two and one-half pounds—that is, the sum of the two thousand eight hundred and eighty weights.

The weights of the back or forty-eighth row are not only the heaviest in themselves, but they hang below those of any of the preceding or more forward rows, and each row also hangs somewhat lower than the row in front of it; and therefore when the front weights (as the beam D descends) shall have reached their farthest point forward in the described arc of movement, and the beam D is perfectly level, the back weights will have already turned that point and will be receding on the lower arc, and this, it will be seen, obviates any difficulty that might otherwise arise from binding on the strings or connections after the weights have dropped past the skin, leather, or other article lying on the slats to be measured.

The grooves or concaves $g'$, which rest upon the points or square edges $h$, being, say, about seven-eighths of an inch in depth, it will be evident that a line drawn from the top of that groove or concave to the point at which the first or outer row of weights is suspended will at the forty-eighth row be about three-fourths of an inch higher than at the first or outer row; and therefore, as all the rows are suspended from the same graduated under surface or plane of the table or beam D, the suspension-point of the forty-eighth row will be some three-fourths of an inch lower than the suspension-point of the first or front row, and that the suspension-points of all the intermediate rows will gradually vary accordingly proportionately to their distance from the fulcrum-points; and this alone may give, in most cases, all the required varying depths of descent of the respective rows of weights. But in other cases, or in larger machines, or where the grooves or concaves $g'$ are shallower as to their depth, the same result may be effected, and to any degree desired, by varying, or rather graduating, the lengths of the strings or cords which sustain the weights, those of the back row being the longest; or the hooks or staples of the several rows may vary in length, and the cords be all of equal length. In either case the result would be the same in character.

It will be manifest that as the upper table is a lever and moves in the arc of a circle, and as its weights are hung on cords or flexible and therefore swinging connections, mere perforations in the lower or stationary table would not be practicable, as they would not permit the unobstructed descent of the weights, and no accurate measurement could be made. The slats and their intervening spaces must also run in the direction from the front to the back of the machine.

The bracket K may be of any form desired having the requisite strength, and the spring-balance may be connected with it in any way preferred. I prefer, in general, a simple bracket, and to hang a spring-balance on a hook at its extremity, as shown in Fig. 8.

The dial-plate may, of course, be marked off or graduated in any desired way adapted to the size or character of the particular machine; but as a general rule it is desirable that it shall be so graduated that when the table D is brought down and the lever $q$ hooked in front, and the whole aggregate weight of the weights $e$ is upon the spring-balance, the hand or pointer will move around one-twentieth part of the dial-face for every foot of surface of the skin or material placed on the slats.

In order to use the same apparatus for a weighing-machine, I suspend a table or platform, U, from the chains or other connections $v$, which connect the spring-balance to the upper or lever table, D, and on the same dial-plate and with the same pointer already described indicate the weight of any skin or number of skins placed upon the platform, a special graduated scale being marked off for this purpose on the dial-plate, and the graduations being, of course, in a direction the reverse of that used for the measuring.

Figure 8:
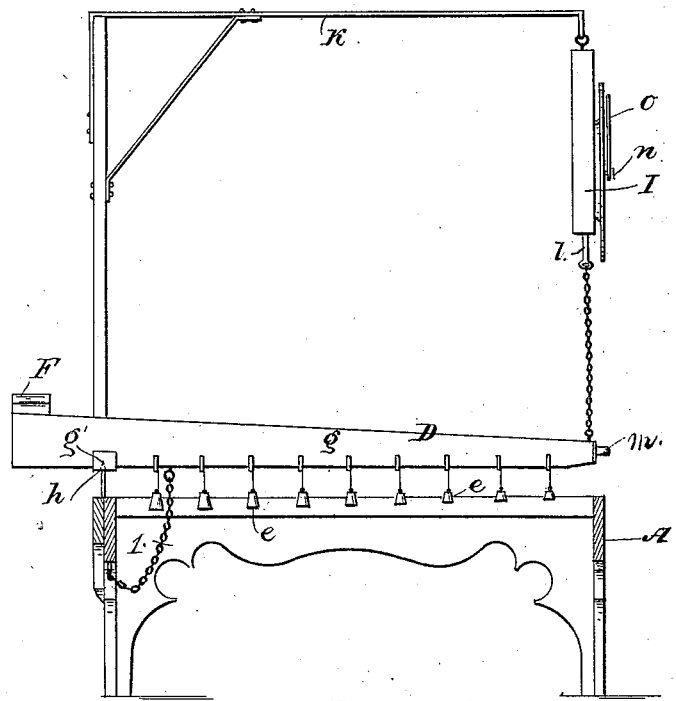
Figure 9:
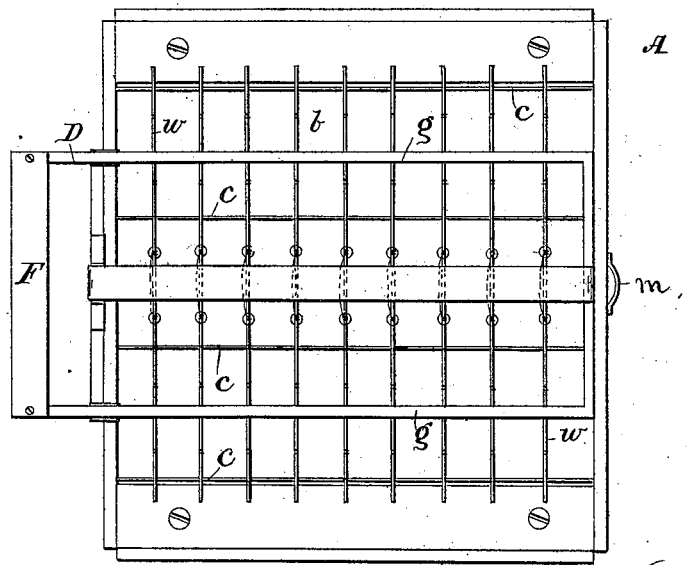

The weight or weights F, instead of being attached, as shown in Fig. 2, to the under side of the braces $g\ g$, are preferably secured to its top, as shown in Figs. 7, 8, 9, at a point, say, four or five inches or more above the plane or level of the fulcrum or pivotal point $g'$, and in this way the lever-table is rendered almost automatic in its action, needing only about an ounce or two of weight, or of equivalent power, to bring it down, and very little to push it up and back, and for the reason that in descending these elevated weights F practically become farther distant from the fulcrum and increase their leverage, while in ascending they approach nearer to it and decrease the leverage. Chains 1 limit the upward-and-backward movement of the lever-table D.

The braces $g\ g$ may be notched on their under sides to receive cross-slats $w$, (see Figs. 7 and 8,) and these slats may be made with saw-cuts $y$ to receive the cords of the weights $e$, as shown in Fig. 5, and a simple mode of applying the weights is to attach a weight to each end of a short cord and then lodge this cord in two adjacent saw-cuts of the same slat, as shown, the loop or bend of the cord holding to that part of the slat between such cuts, as indicated by dotted lines at $z$. A handle, $m$, serves for readily pulling down the upper or lever table.

The surface of the lever-table D may be either solid, as shown in Fig. 1, or a skeleton one, open and slatted, as shown in Figs. 8 and 9, and I prefer the open construction. It is much simpler and lighter, and admits of attaching or adjusting the suspended weights more readily and satisfactorily, and permits the braces or beams $g\ g$ to be placed nearer to each other, the ends of the slats extending beyond the beams, and allows at all times of an inspection through the tables and of a view of the skin and weights $e$ during the measuring, while for weighing purposes the material to be weighed may be laid directly on the slats.

I claim—

1. In a machine for measuring the area or superficies of skins or other articles, a stationary slatted table having long or continuous openings between the slats to permit the descent of rows of measuring-weights, substantially as shown and described.

2. The counterpoised measuring lever-table D, having a system of suspended weights, and fulcrumed at or near its rear, and flexibly connected at its front with the balance or indicating apparatus, substantially as shown and described.

3. In combination, the lever-table D, and a weighted lever-arm supported above such table and serving to aid in lifting it, substantially as shown and described.

4. A system of graduated weights suspended from the under side of the lever table or beam, and having those of each row heavier than those of its next adjacent forward row, substantially as shown and described.

5. A system of weights suspended from the under side of the lever table or beam, and having those of each row hang lower than those of its next adjacent forward row, substantially as shown and described.

6. In combination, the fulcrum table or beam, the weighted rod or lever $q$, the guide-pulley $s$, and its stationary standard or support, substantially as shown and described.

7. The counterpoised or balanced lever-table D, having its rearmost or counterpoise weight located thereon at a point or in a plane above that of the fulcrum or pivotal points of such table, and serving thus to hold it up when raised and to keep it level when lowered, substantially as shown and described.

8. In combination, the fulcrumed table or beam, a system of weights suspended therefrom, the stationary slatted table, and a device for clasping this table to the weighted rod or lever, substantially as shown and described.

DAVID THOS. WINTER.

Witnesses:
CHAS. E. TEAGUE,
CHAS. E. HOAG.